Figure 1:
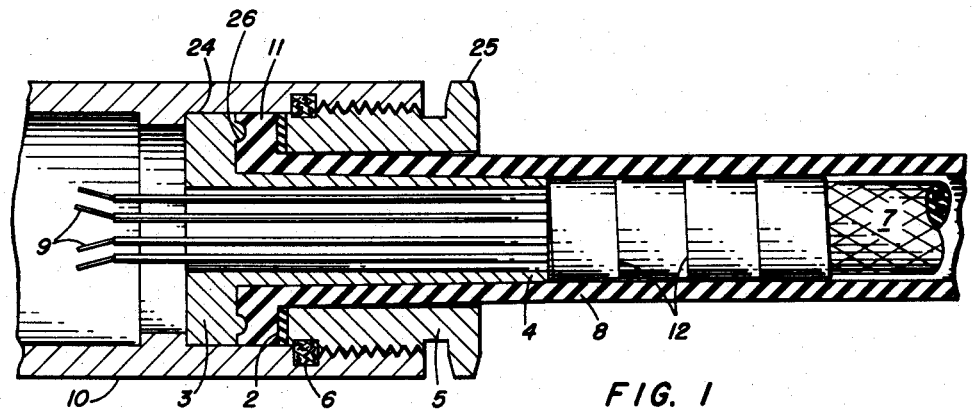

Jan. 8, 1963   S. O. LOMBARD ETAL   3,072,415
MINIATURE WATERPROOF PRESSURE SEAL
Filed Oct. 27, 1961

INVENTORS
SHERMAN O. LOMBARD
GILBERT R. BARTH

BY W. O. Queenberry
   Claude Funkhouser

ATTORNEYS ns patent office 3,072,415
Patented Jan. 8, 1963

3,072,415
MINIATURE WATERPROOF PRESSURE SEAL
Sherman O. Lombard, Campbell, and Gilbert R. Barth, Palo Alto, Calif., assignors, by mesne assignments, to the United States of America as represented by the Secretary of the Navy
Filed Oct. 27, 1961, Ser. No. 148,299
1 Claim. (Cl. 277—112)

The present invention relates to a water-proof seal and more particularly to a means for sealing a cable in an aperture through a pressurized vessel where the seal is arranged to resist the pressure on the vessel by means of its own internal mechanical compression.

Where electrical devices must operate in a pressurized closure, for example, a submarine or aircraft hull, a leak-proof, pressure-tight penetration of the closure must be made. All known commercial devices of this type are subject to leakage at pressure of about 250 p.s.i.g. because the section of the penetrating element, for example, a simple electrical cable, is reduced in cross-section at its penetration point and consequently is weakened causing leakage. The present invention solves this problem by providing a leak-proof seal at pressures up to 1,000 p.s.i.g. The leak-proof pressurized seal in this case is of a type particularly apt for sealing electrical cable penetrations through such containers as a water-proof motor housing, a pressure type junction box housing or a housing containing control and recording elements for use in environments subject to the pressures from explosions, from water immersion or from a gaseous atmosphere. In principle, the only limit to the pressure-resistance capabilities of the invention is the internal pressure limits built up by the seal itself. The instant invention has a further advantage in providing a means whereby wide ranges of seal pressures can be provided for simply by creating an internal pressure within the seal itself which is higher than the expected ambient pressure on the seal from without. This greatly improved strength is accomplished by using a separate cable sheath over the cable proper in the sealing area and then compressing a portion of this cable sheath with a packing nut until the internal mechanical forces of compression exceed the maximum external hydrostatic or gaseous pressures on the seal. Thus, outer pressures are resisted by providing higher internal pressures on the sealed cable.

It is an object of this invention to provide a high-pressure, water-proof, pressure-tight penetration of an enclosure.

It is a further object of this invention to provide a leak-proof seal satisfactory at pressures of about 1,000 p.s.i.g.

A further object is to provide an economical seal where water-proof, pressure-tight electrical connections must be made in a limited space.

Another object is to provide an economical means of producing a high pressure seal with simple screw machine methods and molding techniques.

A still further object is to provide an inexpensive seal which can be assembled or cast or fabricated housings where a boss or other small extra session can be provided for the body of the seal.

Another object is to provide a seal which may be fabricated by unskilled personnel.

Yet another object is to provide a seal having a high dependability at extreme pressure atmospheres.

A still further object is to provide a seal of the high pressure type which is subject also to a high degree of miniaturization.

A further object is to provide a high-pressure, water-proof seal which is leak proof over an extended period of time.

Another object is to provide a seal which is extremely resistant to external high pressures by virtue of having a higher internal pressure.

Yet another object is to provide a leak-proof seal adaptable to higher extremes in pressure, yet using only a few standard components to effect this.

Other objects and many of the attendant advantages of this invention will be readily appreciated as the same becomes better understood by reference to the following detailed description when considered in connection with the accompanying drawings wherein:

FIG. 1, which is a longitudinal sectional elevation of the cable and seal; and

Figure 2:
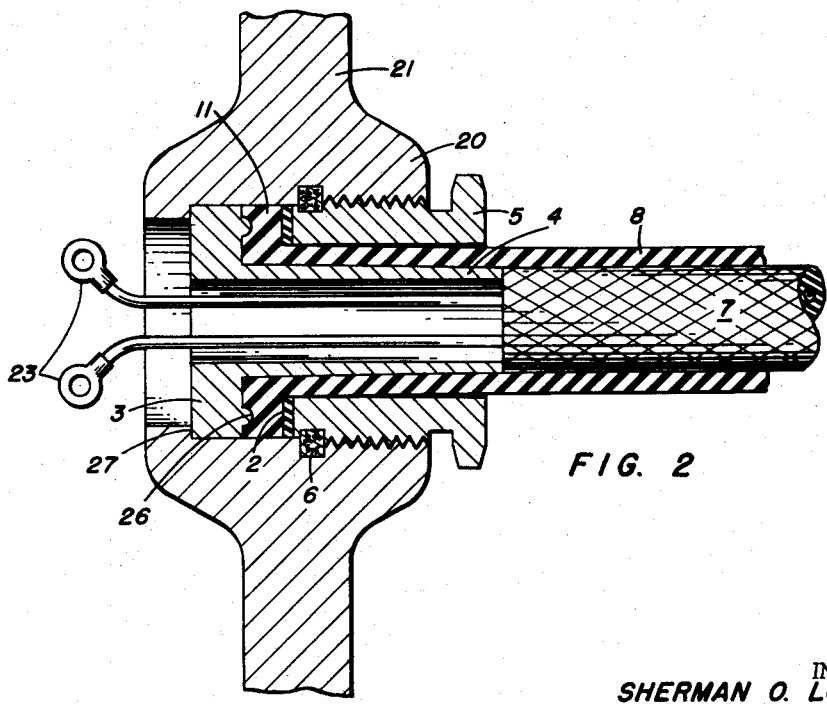

FIG. 2 is a longitudinal sectional elevation of the seal shown in FIG. 1 leading into the wall of a typical missile to be sealed.

In the illustrated embodiment of the invention the sealed vessel may be of any conventional type such as one having a wall as shown at 21 in FIG. 2 through an enlarged portion of which at 20 is introduced an element traversing the plane of this wall. The particular traversing means in the embodiment in FIG. 2 happens to be an electric cable 7 made up of a plurality of wires as at 23 and 9 in FIG. 1, but the seal has utility in many other different forms of traversing elements which must penetrate a sealed closure such as that illustrated. Such elements might consist of conduits for material, support elements for structures internal of a vessel, mechanical controls, etc.

As shown in the embodiment illustrated in FIG. 1 the invention provides a means whereby an electric cable 7 may penetrate the wall of a pressurized closure through an orifice into the closure 10. Fitting 10 has a shoulder arranged in annular form midway along its section at 24 on which rests the tapered bushing 3. Bushing 3 tapers slightly and uniformly towards its outward section 4 and provides a means whereby the cable 7 may be separated from its covering sheath shown at 8. The bushing 3 also provides a seat against which the sheath may be pressed by the packing nut 5. The cable is made up of individual wires as shown at 9 which are wound together in a convenient compact tubular form, then overwound with an insulating tape the layers of which are shown at 12. Finally, the tape is covered with an insulating neoprene sheath 8. Although neoprene is shown, the sheath may be made of any convenient flexible insulating material which also may moulded at its joining end, as at 11. Connecting end 11 of this insulating sheath is moulded in L-shaped fashion to provide an annular flange abutting the bushing 3 in sealing fashion. This abutting end has an annular indentation for positioning and gripping purposes which meets with an annular ridge 26 on the sealing base of the bushing 3. This ridge 26 may be of any convenient gripping configuration. The seating flange 11 of the sheath 8 is compressibly seated against the bushing 3 by a packing nut 5 which, in this illustration, is threadably engaged with the inner wall of orifice 10. Thus, the packing nut 5 may be screwed into the orifice and against the sheath flange 11 to force it sealingly and with tremendous pressure against the bushing. The positioning ridge 26 helps to hold this flange in position and prevent spreading. For higher threading torques the head of the nut 25 may be enlarged in diameter and provided with suitable gripping surfaces for the tightening wrench. A packing washer 2 may be provided between the packing nut 5 and the flange 11 to prevent the nut from digging into and gouging the flexible flange 11 and thus tearing it. A second packing washer may be provided between the thread edges and the lower inner wall of the orifice fitting 10. This second washer would prevent leaks along the fitting wall, and further, if fabricated of a somewhat rigid material such as nylon, would provide a stop against which the nut will bear when it reaches a predetermined pressure point. This last provision of a stop is a means of preventing the packing nut from exceeding safe pressures on the sheath flange 11 thereby protecting it from injury. This washer-stop further provides an accurate and adjustable gage of compression. Its width may be varied to determine the degree of insertion of packing nut 5; hence, setting a limit on the force of compression upon the sheath.

In the embodiment illustrated in FIG. 2 there is shown an example of how the seal may be adapted to penetrate the wall of a pressurized container. In this embodiment, the shoulder provided for seating the bushing 3 is an annular shoulder cut into the enlarged portion 20 of wall 21 and providing a seating surface at 27. The wires comprising cable 7 are shown in a slightly different form as, for instance, at 23. It may be noted that the apertured portion of the closure wall 21 shown at 20 is enlarged in thickness to assure maximum pressure resistance at and around the sealed aperture. This enlarged portion also provides more working and joining surface running through the wall of the aperture. This aperture wall is cut out to provide an angular groove for the stop-washer and further may be screw-tapped as show in the illustration to threadingly engage the packing nut 5.

The above illustrations and descriptions suggest only one form of the invention. Here, pressures of up to 1,000 p.s.i.g. were satisfactorily sealed against by simply using a separate cable sheath over the cable traversing the pressurized wall in the pressurized area and compressing a portion of this cable sheath with a packing nut inside the wall until the mechanical internal forces exceed the maximum external hydrostatic pressures. This internal pressure is variable and may be made adjustable as seen, for example, by varying the width of the stop-washer 6. It is emphasized that the instant inventive concept may assume many forms and embodiments other than that above.

When used as a water-proof pressure seal the invention as described above has important commercial utility for protecting electrical wiring where it must penetrate motor housings adapted for use in a water-proof, an explosive-proof or a vapor-proof atmosphere. The invention has a bonus advantage where minitiarization is important, since the simplicity and general availability of its parts make it easily miniaturizable. One particularly apt application is for deep well motors where long life resistance against erosion and leakage is critical. The seal has further commercial value where electrical wiring must make penetrations into water-proof, pressure-tight junction boxes. Further uses for the seal are in electrical wiring which must penetrate sealed relays, timers, recorders, gages, instruments, and motors in fire-proof or explosion-proof equipment. Another useful environment is for use with electrical wiring to penetrate sealed control and operation equipment in sewage disposals and/or water purification systems. In sealing electrical wiring into housings for ignition systems on high altitude aircraft the invention is particularly apt, especially since it may be miniaturized and thus save costly space.

Obviously many modifications and variations of the present invention are possible in the light of the above teachings. It is, therefore, to be understood that within the scope of the appended claim the invention may be practiced otherwise than as specifically described.

What is claimed is:

In a leakproof seal of the class disclosed including a seal support having a centrally disposed bore extending therethrough, a bushing disposed within said bore, a rigid annular member on said bushing and having an annular sealing ridge thereon, a rigid elongated tubular member on the annular member and tapered throughout the entire length thereof, an electrical cable, a flexible sheath enclosing said cable and having a portion thereof disposed about and in sealing engagement with said elongated tapered tubular member, a flexible annular flange on said sheath portion enclosing the elongated tapered tubular member, a thrust washer disposed on said sheath portion in engagement with said flexible annular flange in opposition with respect to the annular member for protecting the flexible annular flange during compression thereof, a nut in threaded engagement with said bore and driving connection with said washer for compressing the flexible annular flange between the washer and the annular member and into sealing engagement therewith and with said support and the sealing ridge and concurrently therewith compressing the sheath portion into engagement with the tapered tubular member, a shoulder on the support and disposed within the bore in engagement with and cooperating with the annular member to effect compression of the flexible flange between the annular member and the washer by the nut, an annular groove in said support in communication with the bore, and a sealing gasket disposed within said groove engageable and compressible by the nut as the nut is threaded into the bore for providing a sealing connection between the nut and the support.

References Cited in the file of this patent

UNITED STATES PATENTS

| | | |
|---|---|---|
| 1,595,310 | Mueller et al. | Aug. 10, 1926 |
| 2,419,592 | Richardson | Apr. 29, 1947 |
| 2,443,145 | Payne | June 8, 1948 |
| 2,593,219 | Thomas | Apr. 15, 1952 |
| 2,671,127 | Hope | Mar. 2, 1954 |
| 2,673,233 | Salisbury | Mar. 23, 1954 |
| 2,771,502 | King et al. | Nov. 20, 1956 |
| 2,783,298 | Brown et al. | Feb. 26, 1957 |